UNITED STATES PATENT OFFICE.

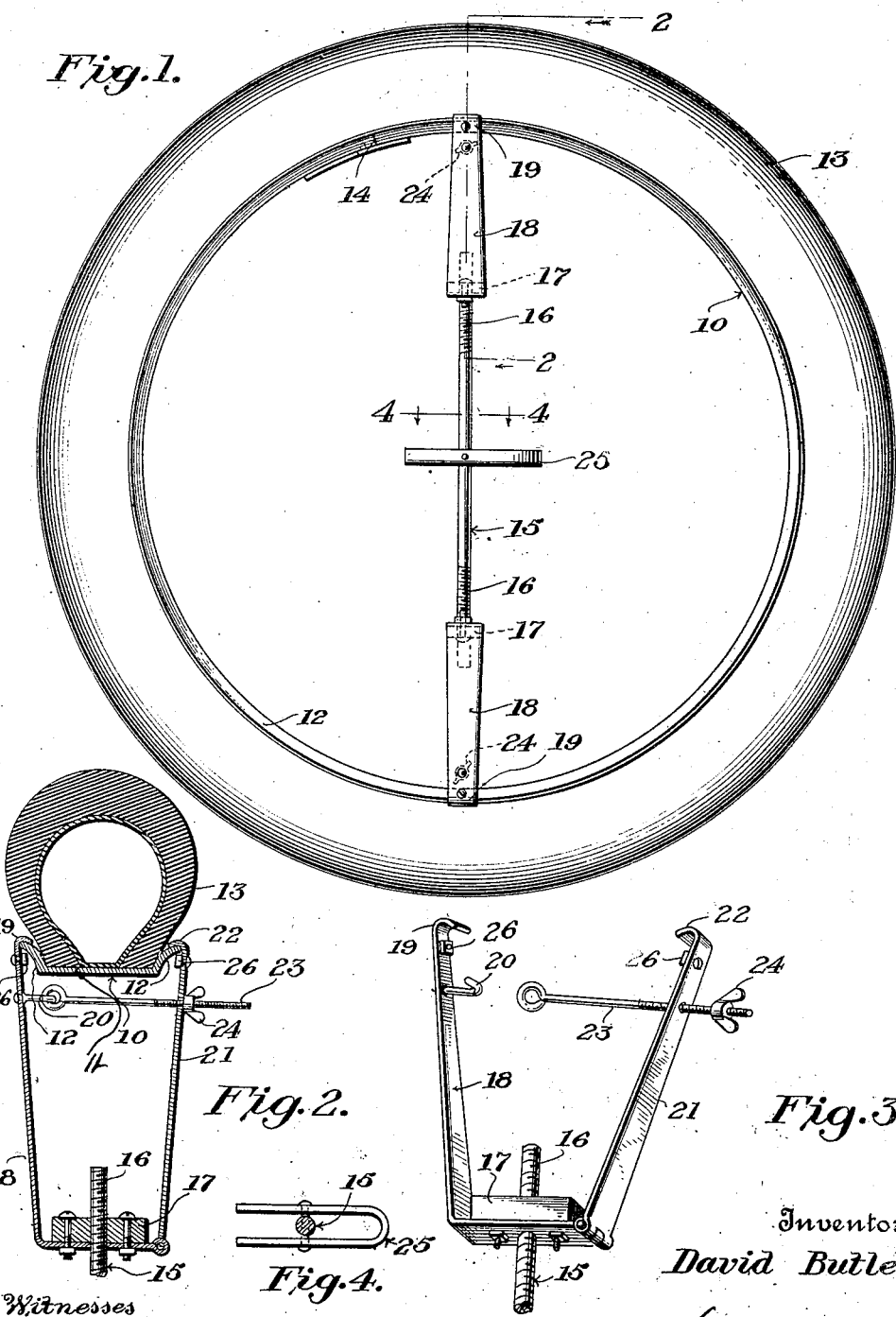

DAVID BUTLER, OF MONTEZUMA, NEW YORK.

TIRE-RIM TOOL.

1,323,961.   Specification of Letters Patent.   Patented Dec. 2, 1919.

Application filed January 21, 1919. Serial No. 272,246.

*To all whom it may concern:*

Be it known that I, DAVID BUTLER, a citizen of the United States, residing at Montezuma, in the county of Cayuga, in the State of New York, have invented certain new and useful Improvements in Tire-Rim Tools; and I do hereby declare the following to be a full, clear, and exact description of the invention, such as will enable those skilled in the art to which it appertains to make and use the same.

My invention relates to tire rim tools of the type utilized for contracting and expanding demountable rims, and has for its object to provide a tool of this character which will be of simple and durable construction and comparatively inexpensive to manufacture and which at the same time maintains a desired standard of efficiency.

With the above and other objects in view the invention consists in the details of construction and in the arrangement and combination of parts to be hereinafter more fully described and particularly pointed out in the claim.

In describing the invention in detail reference will be had to the accompanying drawings wherein like characters of reference denote corresponding parts in the several views, and in which—

Figure 1 is a side elevation of a tire and rim with a tool constructed in accordance with my invention illustrated in position ready to contract the rim and remove the same from the tire;

Fig. 2, a section on the line 2—2 of Fig. 1;

Fig. 3, a detail perspective view of one end of the tool; and

Fig. 4, a section on the line 4—4 of Fig. 1.

Referring to the drawings 10 indicates a vehicle wheel rim of the type commonly known as demountable, said rim being provided with the usual channel 11 and flanges 12. Engaged with the rim 10 in the usual and well known manner is a pneumatic tire 13. The rim 10 is split or broken at 14 which permits of its expansion and contraction through the medium of the tool in a manner that will hereinafter appear.

My improved tool is shown as comprising a rod 15 having its ends reversely threaded as at 16. Operatively engaged on the threads 16 at each end of the rod 15 is a block 17 and secured to each block in a rigid manner is a rim engaging arm 18 the free end of which terminates in a hook portion 19 for engagement with one of the flanges 12 as will be obvious, while the inner end of said arm is secured across the base of the related block. Each arm 18 also carries an inwardly directed hook member 20 for a purpose that will presently appear. Pivoted to the inner end of each arm 18 is another rim engaging arm 21 the free end of which is provided with a rim engaging hook portion 22. Slidably engaged in an opening in each arm 21 is an eye bolt 23, the eye portion of which is adapted for detachable engagement with the hook member 20 of the related arm 18. Threaded on the bolt 23 is a nut 24 which acts against the outer side of the arm 21. Secured centrally of the rod 15 is an operating handle 25 whereby the rotation of the rod may be manually effected to force the blocks 17 outwardly and inwardly as may be desired to expand and contract the rim.

In the use of the tool the blocks 17 are first adjusted so that the hook portions of the arms 18 may be engaged over one of the flanges of the rim. The arms 21 are then swung to a position to engage the eyes of the bolts 23 with related hook members 20 and the hook portions 22 with the related flange 12 of the rim. The nut 24 is then operated inwardly to positively lock related arms 18 and 21 against spreading.

The handle 25 is then operated to rotate the rod 15 in a direction to move the blocks 17 inwardly. This will contract the rim and permit its ready removal from the associated tire.

If it is desired to expand the rim the operation is the same with the exception that the rod 15 is rotated in the opposite direction, cleats 26 being provided on the arms 18 and 21 to support the rim during expansion and maintain operative connection between the rim and the tool.

What I claim is:—

In a tire rim tool the combination of a rod having reversely threaded ends, a block threaded on each end of the rod, a rim engaging arm fixed on each block and having its inner end portion extending across the base of the block, a second rim engaging arm pivoted to the inner end of each first named rim engaging arm, an eye bolt slidably engaged through an opening in each pivoted arm, a hook member carried by each of the rigid arms with which the eye of the related bolt is detachably engageable, a nut threaded on each bolt operating against the outer face of the related pivoted arm, and means for rotating the rod.

In testimony whereof I affix my signature in the presence of two witnesses.

DAVID BUTLER.

Witnesses:
JOHN A. ROCKEFELLER,
EMERSON REMER.